ULTRAHIGH FREQUENCY PHONON GENERATOR AND RELATED DEVICES

Filed Oct. 12, 1966 3 Sheets-Sheet 1

INVENTORS: A. H. DAYEM
W. F. EISENMENGER
B. I. MILLER
BY Wilford L. Wisner
ATTORNEY United States Patent Office 3,405,374

Patented Oct. 8, 1968

3,405,374

ULTRAHIGH FREQUENCY PHONON GENERATOR AND RELATED DEVICES

Aly H. Dayem, New Providence, Wolfgang F. Eisenmenger, Summit, and Barry I. Miller, Plainfield, N.J., assignors to Bell Telephone Laboratories, Incorporated, Berkeley Heights, N.J., a corporation of New York Filed Oct. 12, 1966, Ser. No. 586,247

13 Claims. (Cl. 333—30)

ABSTRACT OF THE DISCLOSURE

In the superconducting devices disclosed, phonon generation or detection is achieved through tunneling by charge carriers.

The devices include a delay line, a reversible generator-detector, a coherent phonon generator, a signal amplifier, and a spectrum analyzer.

This invention relates to devices for the generation and detection of phonons, and particularly to such devices having a low-frequency cutoff.

In this application we use the word phonons in the sense of concentrated packets, or quanta, of vibrational energy. The concept of phonons is generally useful only when the phonons have a limited frequency spectrum. Such energy is also sometimes called acoustic energy. Acoustic energy should be distinguished from the heat content of the substance, insofar as the latter concept refers to vibrational energy, on the basis that the heat content is distributed among all possible vibrational modes of the substance, as governed by the black body radiation law.

Devices capable of generating, delaying and detecting phonons have a variety of uses including, typically, the probing of the properties of crystalline materials. In addition, phonon delay lines are useful in communication circuits for introducing appropriate signal delays. Further, devices for generating and detecting phonons of sufficiently short wavelength may be useful in specialized probing devices which may be referred to as acoustic microscopes, inasmuch as the resolution obtainable improves as the phonon wavelength becomes shorter.

It would be desirable to obtain acoustic wavelengths shorter than 100 Angstrom units. Nevertheless, it is not feasible to obtain significant powers of such phonons unless the generation of phonons of longer wavelengths, i.e., lower frequency, can simultaneously be inhibited.

We have discovered, in suitable superconductive devices, the generation of significant streams of ultra-high-frequency phonons characterized, in all cases, by a very sharply defined low-frequency cutoff and, optionally, by a high degree of monochromaticity.

According to another feature of our invention we have recognized that the use of an appropriate acoustic resonator will make such a phonon stream to be coherent. A device achieving this result will be the first such phonon device. This step can be analogized to the step from the incandescent lamp to the laser.

Further features of our invention reside in its application for delay lines, probing apparatus, reversible generator-detectors, signal amplifiers, and spectrum analyzers.

Further features and advantages of the present invention will become apparent from the following detailed description, taken together with the drawing, in which.

Figure 1:
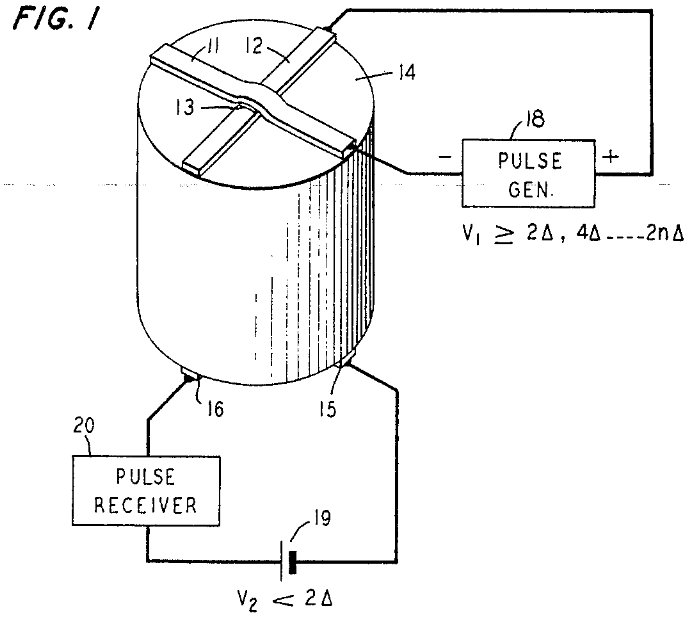
FIG. 1 is a partially pictorial perspective and a partially schematic illustration of a basic embodiment of the invention, including both means for generating the phonons and means for detecting the phonons.

The device shown in FIG. 1 is an illustrative form of the device employed in making our experimental discoveries. In the discussion that follows, it should be understood that the superconductive elements and substrates are typically all maintained at cryogenic temperatures, for example, liquid helium temperature (1.3° Kelvin).

In FIG. 1 a superconductive stripe 12, a barrier layer 13, and a superconductive stripe 11 are deposited upon a crystalline substrate 14, which is illustratively a polished surface of a sapphire single crystal. The area of interest for the present invention lies within the region of overlap of the stripes 11 and 12 and may be about one square millimeter in area.

On the opposite polished surface, which is parallel to the first surface, of substrate 14 threre are deposited, in succession, superconductive stripe 15, a barrier layer 17 (not shown) and a superconductive stripe 16, all of which have a region of overlap directly opposite the corresponding region of the stripes 12 and 13 and displaced therfrom in the normal direction through the substrate 14.

A direct-current voltage pulse generator 18 has its negative terminal connected to stripe 11 and its positive terminal connected to stripe 12, which lies between barrier 13 and substrate 14. A voltage source 19 has its positive terminal connected through a pulse receiver 20 to stripe 16 and has its negative terminal connected to stripe 15, which lies between stripe 16 and the substrate 14. The combination of stripes 11 and 12 and barrier 13 and bias source 18 comprises a phonon generator, the substrate 14 comprises the output coupling means, the stripes 15 and 16 and barrier 17 together with the indicator 20 and bias source 19 comprise a phonon detector.

The device is fabricated as follows. Once the opposing surfaces of substrate 14 have been polished to lie in sufficiently parallel positions, stripe 12 is deposited by vacuum deposition to a thickness of about 1500 Angstrom units. Stripe 12 is then exposed to an atmosphere of a suitable gas such as oxygen, air, hydrogen or helium to form the barrier layer 13 on the surface thereof. The nature and composition of the barrier layer is not well understood; but it is assumed to be an insulating layer that is a few Angstrom units thick in the region of overlap. It is likely that it is tin oxide ($SnO_2$) in the preferred form, in which stripe 12 is exposed to oxygen. The device is then returned to a vacuum and the stripe 13 is deposited by vacuum deposition to a thickness of about 3,000 Angstrom units.

On the opposite surface of substrate 14, the stripe 15 is deposited to a thickness substantially like that of stripe 12, the barrier layer 17 is formed in substantially the same way as the barrier layer 13 and the stripe 16 is deposited to substantially the same thickness as stripe 11. Suitable external electrode connections are then made to all of the stripes.

The constant direct-current voltage of source 19 is less than, illustratively 0.7 times, the aforesaid energy gap; and the pulse voltage of source 18 is illustratively variable from zero to values numerically several times the energy gap in electron-volts. The pulse receiver 20 is illustratively a sampling oscilloscope which samples and determines the height of the received pulse.

The operation of the embodiment of FIG. 1 will now be described with reference to FIG. 8.

Upon the application of a pulse of voltage, numerically slightly larger than the energy gap, from source 18 between stripes 11 and 12, a current pulse flows from source 18. After a time delay period corresponding approximately to the time required for sound to propagate through substrate 14 in a direction normal to the cleaved surfaces thereof, three distinct pulses are indicated by the current indicator 20. Measurements and calculations indicate that these three pulses correspond to the three acoustical wave modes that can propagate in the substrate 14 in the aforesaid direction, which, in our experiments, was the *a* crystalline direction. These three modes are the longitudinal acoustical mode and two transverse, or shear, acoustical modes having mutually orthogonal polarizations. These three modes all have slightly different propagation velocities in the substrate 14.

The height of the pulses received by the receiver 20 were measured as a function of the current pulse height applied between stripes 11 and 12. It was found experimentally that the two quantities are approximately linearly dependent up to a bias voltage equal to twice the aforesaid energy gap. At this bias there is a sharp upward kink in the curve. From this value to a value three times the energy gap the signal again increases linearly with the bias current, but with a slope about 2.5 times the slope in the previous bias range. For bias voltage greater than three times the energy gap the signal increases faster than linearly with the bias current.

To give a qualitative theory of our experimental results we use a simplified semiconductor model of the excitations in the superconductor. This model, when used with proper caution, is quite helpful for discussing tunneling phenomena. Reference to FIG. 8 shows that the model consists of an energy gap or forbidden band symmetrically situated around the Fermi level; the top of the gap lies above the Fermi level and is separated from it by an energy $\Delta$, while the bottom of the gap lies below the Fermi level with an equal separation $\Delta$. The width of the energy gap is therefore $2\Delta$ and represents the minimum energy required to break up the superconducting pairs and to create excited carriers. Above the top of the gap lies the so-called conduction band where charge carriers may appear in response to suitable excitation. Below the bottom of the gap lies the so-called valence band where charge carriers are in abundance. In our model, a carrier in the conduction band will be referred to as an excited carrier which, given long enough time, will relax to the ground state of the system emitting one or more quanta of energy. The minimum energy of an emitted quantum is obviously equal to $2\Delta$ and obtains when the excited carrier is at the top of the energy gap, i.e., the bottom of the conduction band. In this particular case we will refer to the process as a recombination process to distinguish it from those processes involving the relaxation of an excited carrier from one level to a lower level in the conduction band.

Figure 8:
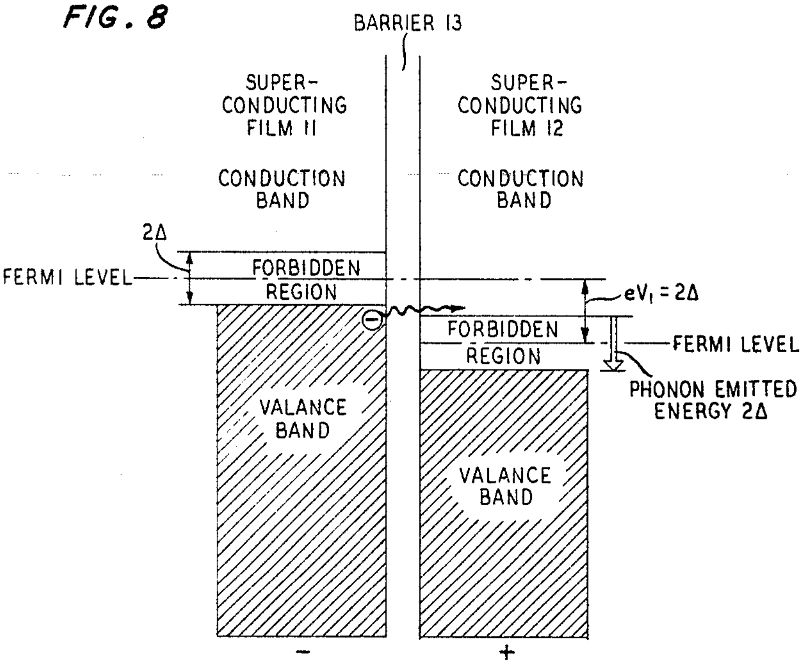

When the voltage pulse from source 18 is applied, the energy bands for stripe 11 are shifted, with respect to the energy bands for stripe 12, as shown by the vertical relative displacements in FIG. 8. The applied voltage displaces the Fermi levels of the two stripes by an amount which is equal to the electronic charge, *e*, times the voltage. Hereinafter the energy units employed will be electron-volts, so that *e* becomes unity. The pulse voltage has been chosen so that the aforesaid product is equal to or slightly greater than the width of the gap. Under these conditions a charge carrier can tunnel from the valence band of stripe 11 through the barrier layer 13 and occupy an energy state in the conduction band of stripe 12. The newly-arrived charge carrier in the conduction band of stripe 12 is an excited carrier (in the sense defined above) and will relax via recombination emitting a phonon of energy $2\Delta$ as shown in FIG. 8.

Figure 9:
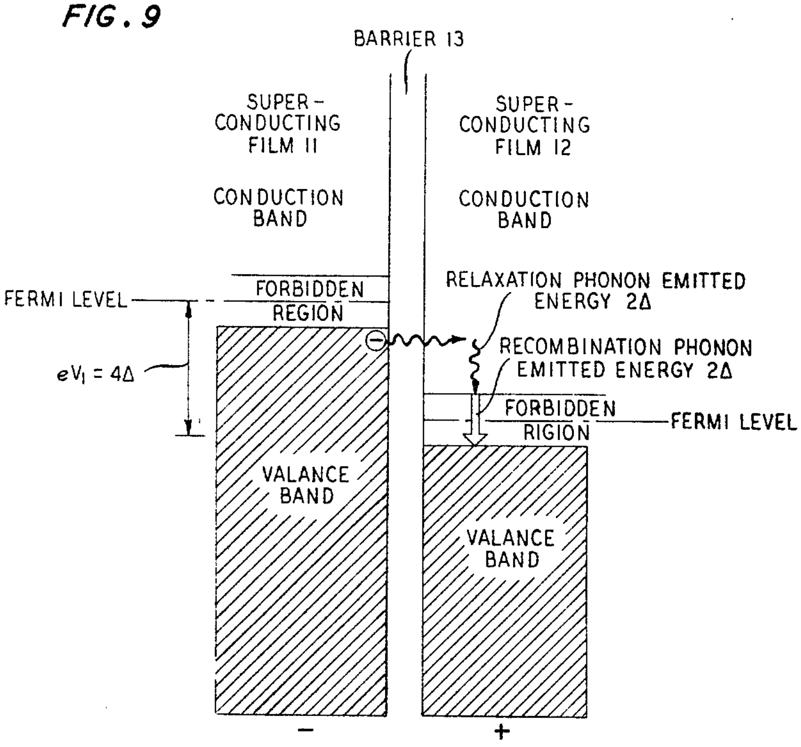

For bias voltage larger than the gap but less than twice the gap, the newly-arrived charge carriers in the conduction band of stripe 12 will most probably undergo two successive relaxation processes: relaxation from the original level to the bottom of the conduction band emitting a phonon of energy less than $2\Delta$, followed by a recombination emitting a second phonon of energy equal to $2\Delta$. Thus every added excited particle in stripe 12 will contribute only one phonon of energy equal to $2\Delta$. Only at a bias voltage equal to or larger than $4\Delta$ would an excited carrier relax emitting two phonons each of energy $2\Delta$ or larger, one in the relaxation to the bottom of the conduction band, the second in the recombination process as shown in FIG. 9. For bias voltages higher than $6\Delta$ the relaxation processes may become complicated due to high energy of the excited carriers and need not concern us here.

The transmitting process is symmetrical in that the bias from source 18 can be reversed. Any phonons propagating initially toward an external face of the device will be reflected to propagate into the substrate.

The operation of the receiver, or detector, portion of FIG. 1 can now be explained, with reference again to FIG. 8. In viewing FIG. 8 for this purpose, the portion previously representing stripe 12 now represents stripe 15 (lying next to substrate 14); and the portion previously representing stripe 11 now represents stripe 16. Also, consider the vertical displacement between the Fermi levels to be slightly decreased to correspond to the voltage of source 19, which is below the level that would enable the receiving device to act as a generator.

As mentioned previously the bias voltage between stripes 15 and 16 in only about $1.4\Delta$. Thus the tunneling current is proportional to the number of excited carriers in 15. The phonon shower transmitted through 14 impinges on stripes 15 and 16. If the phonon energies are equal to or larger than $2\Delta$, carriers in stripes 15 and 16 will be excited to the conduction band and will manifest themselves as in increase in the signal received by receiver 20.

Figures 6, 7:
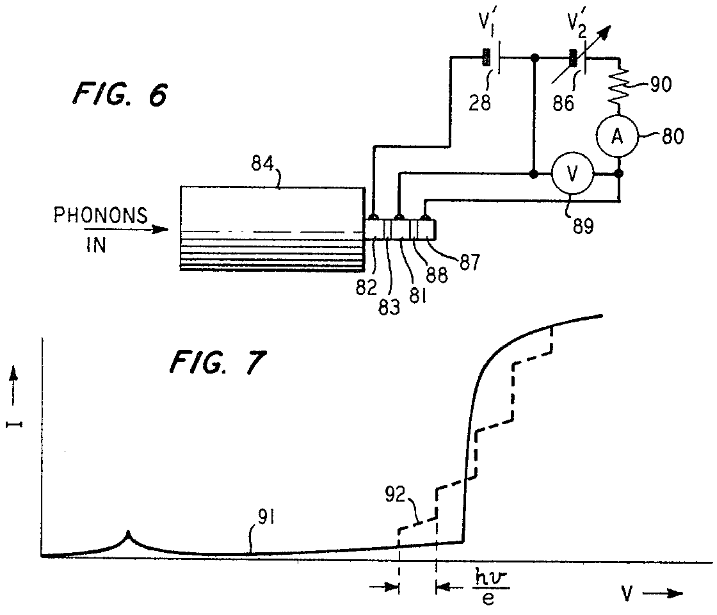
FIG. 6 is a partially pictorial and partially schematic illustration of an illustrative form of an acoustic frequency meter according to the present invention.
FIGS. 7, 8, and 9 show diagrams which are helpful in understanding the theory and operation of the present invention.

Such a detection process has a distinct low-frequency cut-off and thus acts as a high-pass filtering detector for phonons. That is, phonons of energy less than the energy gap produce no significant response. The high-pass characteristic is foreseen to be a desirable characteristic in many applications, one of which is shown in FIG. 6 and is described hereinafter.

The receiving process is also symmetrical in that the bias can be reversed. The incident phonons will eventually propagate into the superconductive stripe in which they can excite carriers for the tunneling process. No further explanation need be attempted with the simplified energy band model.

With the qualification that other processes contribute to the output at voltage levels numerically greater than three times the $2\Delta$ energy gap, the above-proposed theory adequately accounts for the observations. It also accounts for the observed temperature dependence of the received signal amplitude.

Our calculations show that phonon frequency should be about $2.9\times10^{11}$ cycles per second, which corresponds to wavelengths for the three modes that are distributed in the range of three hundred Angstrom units. It will be noted that these acoustical wavelengths are about an order of magnitude shorter than the typical optical wavelengths that can be generated by lasers. Such a short wavelength enables the high resolution that we may expect from acoustical probing devices employing the present invention.

Quantum efficiencies including both the transmitting and the receiving or detecting processes have been calculated from observations for several such devices and range from 0.1 percent to 5 percent at 1.3° K.

It is found that the better overall efficiencies are obtained when the generator bias voltage is numerically equal to or greater than 4Δ.

It is noted that the detector portion of FIG. 1, as well as the other detector embodiments of our invention, will also act as photon detectors with an analogous high-pass characteristic.

Figure 2:
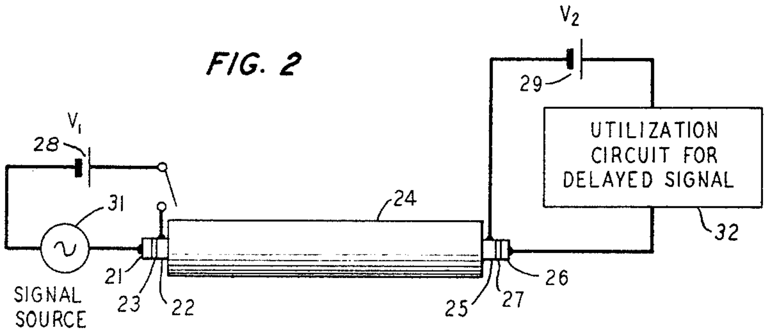
FIG. 2 is a partially pictorial and partially schematic illustration of a preferred form of delay line according to the present invention.

The modification of the embodiment of FIG. 1 for the purpose of delaying a signal is shown in FIG. 2. Hereinafter the generating portion of the device will be termed the transmitting diode and the detecting portion of the device will be termed a detecting diode. The device of FIG. 2 comprises a transmitting diode including superconductive elements 22 and 21, and barrier layer 23, like those of FIG. 1 numbered ten digits lower. The device also comprises a detecting diode including superconductive elements 25 and 26 and barrier 27 like those of FIG. 1 designated with numbers of ten digits lower and further comprises a crystal 24 cut with essentially parallel faces separated by a distance of the material appropriate to provide the desired delay of the signal-modulated phonon stream. A signal source 31 is connected serially with the pulse DC source 28, which is like souce 18 of FIG. 1. A utilization circuit 32, which illustratively is a conventional demodulator and detector circuit for baseband modulated electric currents is connected serially with the voltage source 29, which is like the voltage source 19 in FIG. 1, between superconductive elements 25 and 26.

From the preceding description of the characteristic that relates output voltage to input voltage in the embodiment of FIG. 1, it is seen that the signal from the source 31 will effectively modulate the voltage applied to utilization circuit 32, but that the latter wave form will, of course, be delayed with respect to the former by a time delay that corresponds to the transit time of the phonons through the crystal 24.

Figure 3:
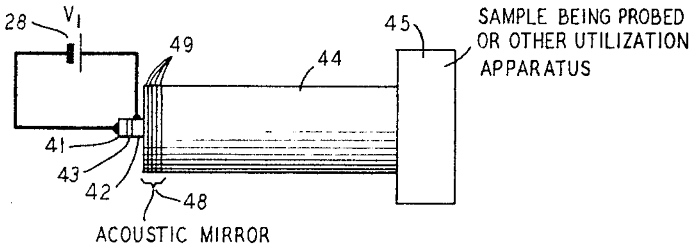
FIG. 3 is a partially pictorial and partially schematic illustration of a preferred form of coherent phonon oscillator, as employed for the probing of crystalline samples.

In addition to the very high frequencies and short wavelengths of the phonons generated, another distinct advantage of the present invention is that it may be modified as shown in FIG. 3 to make the generated phonons more highly monochromatic and essentially coherent. By coherent, we mean that all phonons emitted from the device are in phase with each other. An acoustic device having this property can be called an acoustic maser. Here the transmitting diode is like that of FIG. 2 except that the over-all thickness of the diode is now relatively critical because of the high-Q (resonator quality factor) provided by the acoustic mirror 48. The combined thickness of the superconducting elements 41 and 42 and the barrier 43 should be an integral multiple of half-wavelengths of phonons having an energy equal to the energy gap of the superconductive material. In order to obtain uniform films of these required thicknesses, it is important that the substrate crystal 44 have surfaces flat and smooth to within a fraction of the acoustical wavelength. In order to achieve such a stringent condition, it is necessary to use cleaved surfaces. For example, one should be able to cleave sapphire to obtain a surface whose normal is parallel to the C axis. Over a small area, illustratively less than a square millimeter, the flatness thus obtained is much greater than optical flatness.

Preferably, the voltage of source 28 is just slightly greater than the value which is numerically equal to energy gap in electron-volts. The transmitting diode is mounted upon a plurality of quarter-wavelength-thick mismatched layers of dielectrics or metals or both, which are deposited on the substrate crystal 44. By mismatched, we mean that the acoustic impedances of the adjacent layers are as different as possible. This condition can be stated in an equivalent way by saying that the velocity of sound for any given mode is as greatly different in successive layers as possible. Inasmuch as the velocity of sound does not vary greatly in most different solid materials, the acoustically reflectivity of the composite mismatched layers is made satisfactorily by careful choice of materials. For example we suggest that with seven staggered layers of aluminum and gold of the prescribed thickness, ($[n+1]$ 175 A, and $[n+1]$ 88 A, respectively, where $n$ is 0, 1, 2, 3 . . . ), we can obtain a Q of nearly 100. Accordingly we designate the combination of multiple mismatched layers to be an acoustic mirror. We further suggest that even higher Q's be obtained by alternating metallic layers with dielectric layers. It is noted that the effect of an acoustic mirror is provided at the left-hand surface of element 41 by the presence of vacuum, liquid helium, or a gas. If a solid element appears to the left of element 41, it may be necessary to deposit a multiple-layer acoustic mirror on that surface.

Since such a mirror is not 100 percent reflective, part of the coherent phonon stream that is generated will be transmitted into the substrate crystal 44 and will propagate therethrough to a utilization apparatus 45, which is illustratively a crystalline sample, the crystalline structure of which is being investigated.

Figure 4:
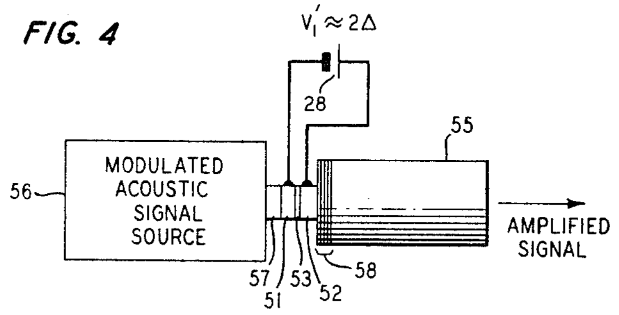
FIG. 4 is a partially pictorial and partially schematic illustration of an illustrative form of a coherent phonon device employed to amplify an acoustic input signal.

The device of FIG. 3 can be rendered usable as an amplifier by reducing the Q of the acoustic resonator slightly below the oscillation threshold and by applying a modulated input stream of phonons predominantly of an energy equal to the energy gap, as illustrated in FIG. 4. Such a stream is provided by the modulated signal source 56, which is illustratively another device like that of FIG. 3 operated above the oscillation threshold on a pulsed basis. The output of the source 56 is transmitted through a matching stub 57 into a transmitter diode like that of FIG. 3. The transmitter diode includes the superconductive element 51, the barrier 53 and the superconducting element 52, in succession. The element 52 is deposited on the acoustic mirror 58 which in turn is deposited on the substrate crystal 55. Illustratively, the voltage of source 28 is numerically equal to energy gap in electron-volts.

An amplified version of the modulated input signal will be obtained as an output signal at the right-hand face of the crystal 55. A suitable matching layer may be deposited on this face of crystal 55. The matching stub 57 is illustratively a material in which the velocity of sound is intermediate between that of the output member of source 56 (i.e., the crystal 44) and the velocity of sound in the superconductive element 51.

Figure 5:
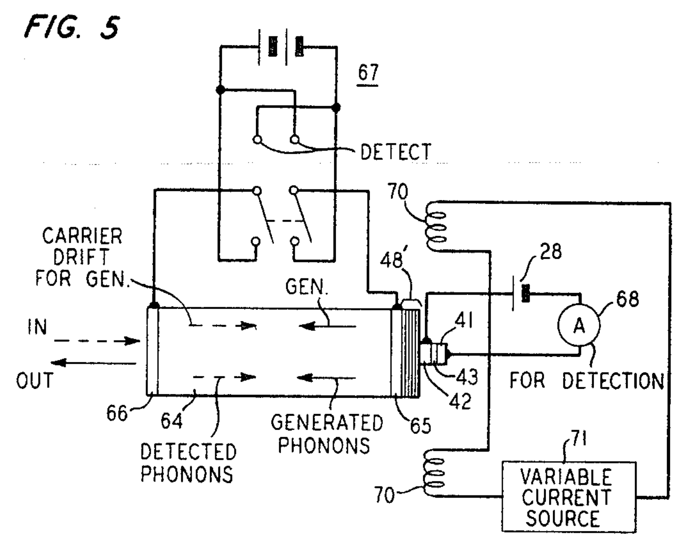
FIG. 5 is a partially pictorial and partially schematic illustration of a preferred form of a reversible coherent phonon generator or amplifying detector, which can also be employed as a spectrum analyzer.

As shown in FIG. 5, is also possible to amplify the output of a coherent phonon oscillator like that of FIG. 3 with a prior art type of acoustic amplifier, for example, that disclosed in D. L. White, Patent No. 3,173,-100, issued Mar. 9, 1965, Re. 26,091, Sept. 20, 1966. As is well known, the basic technique of such an amplifier is that a voltage bias is applied to make the carrier velocity in a piezoelectric crystal to be greater than the velocity of the input phonons. Illustratively, for a cadmium sulfide crystal 64, the bias would be applied through suitable electrodes 65 and 66 in a polarity which makes the output terminal end of the crystal to be more positive than the input end.

Alternatively, the entire device of FIG. 5 can be converted to a detector, with the prior-art acoustic amplifier serving as a preamplifier for the superconductive diode employed according to the present invention. Thus a polarity reversing switch 67 is illustrated for reversing the voltage applied to the amplifier to achieve this conversion of the device. Illustratively, an ammeter 68 is connected in series with the bias source 28 when the device is operated as a detector. When operated as a detector, the device should be provided with an acoustic mirror 48' which has a somewhat higher transmissivity than that of mirror 48 of FIG. 3. It is readily seen that, when operated in the detection mode, the incident phonons are admitted through the right-hand surface of electrode 66, which is adapted to provide a low acoustic loss.

Since a detector according to the present invention has high-pass filter characteristics, it may be employed as a spectrum analyzer if the cutoff frequency can be varied. The cutoff frequency is twice the energy gap divided by Planck's constant. It is well known that the energy gap in superconductors such as superconductive tin can be varied by varying the temperature, or by subjecting the superconductor to a variable magnetic field. Increased temperature and increased magnetic field both decrease the energy gap. Therefore, to employ a detector according to the present invention as a spectrum analyzer one merely employs superconducting materials having sufficiently large bandgaps and subjects them to appropriate temperature and magnetic field variations.

Illustratively, the detector of FIG. 5 can be made into a spectrum analyzer by applying a variable magnetic field through coil 70 consisting of two parts disposed on opposite sides of the transmitting diode (41, 42, and 43). The coil 70 is energized from the variable current source 71.

A related device, a phonon frequency meter, according to the present invention is shown in FIG. 6. In FIG. 6 input phonons are emitted through the substrate crystal 84 and are amplified by a superconducting diode arranged according to the present invention in comprising the superconducting elements 82 and 81 separated by barrier layer 83. The amplified phonons are then detected by a previously known technique where a superconducting diode is subjected to a field provided by a voltage source 86 which is connected between the superconducting element 81 and an additional superconducting element 87 as shown, the elements 81 and 87 being separated by a barrier layer 88. A voltage source 28 is connected between the superconducting elements 81 and 82 in the manner shown in the preceding embodiments.

The action of the second superconductive diode may be explained by reference to FIG. 7 in which curve 91 illustrates the current-voltage characteristic of the diode and the dotted curve 92 represents the superimposed effect of incident coherent phonons of a given frequency. It is seen that the phonons produce a step in the bias current corresponding to a given voltage. These steps remain relatively constant in voltage throughout a large variation of the applied current. The spacing between voltage steps is equal to Planck's constant times the frequency of the phonon divided by the charge of an electron. Thus the spacing between steps is an indication of the frequency of the phonons being received. Accordingly, as one varies the voltage from source 86 through an extended range, one observes the voltages that remain substantially constant as current changes, as indicated by ammeter 80.

It is also possible that the acoustic resonator could be a focusing type resonator, if the curved reflecting surfaces are formed with sufficient smoothness.

It is understood that various other modifications of the present invention can be defined by those skilled in the art without departing from the spirit and scope of the present invention.

What is claimed is:

1. A device capable of phonon generation, comprising at least one superconductive element in which a carrier can be introduced into an elevated energy band,
means for introducing a carrier into said band, whereby an essentially monochromatic generation of phonons can occur, and
output means for coupling at least a portion of said phonons from said element, including means for utilizing said portion of said phonons.

2. A device according to claim 1 in which the means for introducing carriers comprises
a film forming an energy barrier through which said carriers can tunnel,
a second superconductive element separated from said first superconductive element by said barrier, and
means for biasing said second element with respect to said first element at a voltage greater than the energy gap in electron-volts of a single carrier in said first element and in a polarity to facilitate tunneling from said second element to said first element.

3. A device according to claim 1 in which the means for introducing carriers comprises
a film forming an energy barrier through which said carriers can tunnel,
a second superconductive element separated from said first superconductive element by said barrier, and
means for biasing said second element with respect to said first element at a voltage substantially equal to an integral multiple of the energy gap in electron-volts of a single carrier in said first element and in a polarity to facilitate tunneling from said second element to said first element.

4. A device according to claim 1 in which the coupling means includes a crystal disposed in proximity to the first superconductive element and in which the utilizing means comprises means for sensing the quantities of phonons that traverse said crystal.

5. A device according to claim 1 adapted as a delay line in that the carrier introducing means includes a signal source adapted to vary the introduction of carriers, the coupling means includes a crystal disposed in proximity to the first superconductive element and having a dimension traversable by the phonons during a time delay period, a superconducting junction disposed on said crystal to intercept said phonons after said time delay period and means for biasing said superconducting junction at a voltage slightly below the energy gap in electron-volts of a single carrier, whereby a signal current is generated that is proportional to the quantity of phonons intercepted by said junction, and in which the utilization means is a circuit adapted to employ said signal current.

6. A device according to claim 1 in which the coupling means includes an acoustic mirror forming a resonator for said phonons to enable the rate of generation of phonons to exceed the rate of loss of phonons and render the generation coherent.

7. A device according to claim 1 in which the means for introducing carriers includes
a film forming an energy barrier through which said carriers can tunnel,
a second superconductive element separated from said first superconductive element by said carrier,
a modulated acoustic signal source,
input means for coupling an acoustic signal from said modulated signal source to said second superconductive element, and
means for biasing said second element with respect to said first element at a voltage substantially equal to the energy gap in electron-volts of a single carrier in said first element and in a polarity to facilitate tunneling from said second element to said first element,
and in which the output coupling means includes an acoustic mirror forming with the input coupling means an acoustic resonator for the phonons, and in which the utilization means is adapted to utilize the amplified acoustic signal which is responsive to the acoustic signal from the modulated signal source.

8. A phonon detector comprising
a superconductive tunneling junction device,
means for introducing into said device phonons to be detected,
means for biasing said junction to tend to oppose tunneling produced by phonons of energy greater than the energy gap in electron-volts of a single carrier, in a region of incidence of said phonons within said device, and
means for detecting current flowing from said biasing means.

9. A phonon detector according to claim 8 in which the means for introducing phonons comprises an acoustic amplifier including
a piezoelectric crystal and
means for biasing said crystal to render the carrier drift velocity to be greater than the phonon velocity,
said amplifier being coupled to the superconducting device, and,
the means for biasing the junction provides a voltage substantially equal to the energy gap in electron-volts.

10. A phonon detector according to claim 9 in which the means for introducing phonons: includes an acoustic mirror disposed to couple said amplifier to said junction and simultaneously to form an acoustic resonator for said junction.

11. A phonon detector according to claim 8 in which the means for introducing phonons comprises
a second superconductive tunneling junction device intercepting incoming phonons and
means for biasing said second junction to amplify the quantity of said incoming phonons, and
the means for biasing the first junction to oppose tunneling comprises means for varying the bias through a range above the energy gap to enable said first junction to respond to only a portion of the amplified phonons, the frequency of said portion selectively depending upon said bias.

12. A delay line comprising
at least one superconductive element in which a carrier can be introduced into an elevated energy band,
means for introducing carrier into said band, whereby an essentially monochromatic generation of phonons can occur,
output means for coupling at least a portion of said phonons from said element, including
means for coupling phonons from said superconductive element to propagate for an appreciable time period, and
means for detecting said coupled phonons after said appreciable time period.

13. A delay line according to claim 12 in which the biasing means includes a source of a signal voltage.

References Cited

UNITED STATES PATENTS

| | | | |
|---|---|---|---|
| 3,200,259 | 8/1965 | Braunstein | 307—322 |
| 3,265,988 | 8/1965 | Dayem et al. | 331—94 |
| 3,289,090 | 11/1966 | Shiren | 330—5.5 |

ROY LAKE, *Primary Examiner.*

DARWIN R. HOSTETTER, *Assistant Examiner.*